US012700798B2

(12) United States Patent
Shafer

(10) Patent No.: US 12,700,798 B2
(45) Date of Patent: Aug. 4, 2026

(54) RESONANT CONVERTER HAVING VARIABLE FREQUENCY CONTROL AND VALLEY SKIPPING TIME-SHIFT FOR EFFICIENT SOFT SWITCHING OPERATION

(71) Applicant: Vitesco Technologies USA, LLC, Auburn Hills, MI (US)

(72) Inventor: Daniel William Shafer, Mussey Township, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 200 days.

(21) Appl. No.: 18/750,558

(22) Filed: Jun. 21, 2024

(65) Prior Publication Data

US 2024/0348159 A1 Oct. 17, 2024

Related U.S. Application Data

(63) Continuation of application No. PCT/US2022/082322, filed on Dec. 23, 2022.

(51) Int. Cl.
H02M 3/335 (2006.01)
H02J 7/04 (2006.01)
(Continued)

(52) U.S. Cl.
CPC ................ H02M 3/01 (2021.05); H02J 7/04 (2013.01); H02M 1/0058 (2021.05);
(Continued)

(58) Field of Classification Search
CPC .. H02M 3/01; H02M 1/0058; H02M 3/33573; H02M 3/33584; H02M 1/007;
(Continued)

(56) References Cited

U.S. PATENT DOCUMENTS 4,953,068 A * 8/1990 Henze ............... H02M 3/33584
363/127
5,546,294 A 8/1996 Schutten
(Continued)

FOREIGN PATENT DOCUMENTS

EP 2638627 A2 9/2013

OTHER PUBLICATIONS

Altin Necmi et al., A Novel Solar PV Inverter Topology Based on an LLC Resonant Converter, 2019 IEEE Energy Conversation Congress and Exposition (ECCE), 2019, pp. 6734-6740.
(Continued)

*Primary Examiner* — Yusef A Ahmed

(57) ABSTRACT

A method of operating a DC-DC converter circuit to maintain an output current to charge a battery is disclosed. The method includes receiving an output voltage of the DC-DC converter circuit and receiving a desired charging current to charge a battery. When the output voltage is greater or equal to the predefined output voltage, the method includes adjusting an operational frequency to a synchronous second gate signal that is synchronous with a first gate signal, where the first gate signal and the second gate signal are each operating at 50% duty cycle and causing the output current to be adjusted to the desired output charging current. When the output voltage is less than the predefined output voltage, the method includes applying an operational time shift to a second gate signal (operating at 50% duty cycle and $f_o$) producing the second voltage waveform in the bridge circuit.

16 Claims, 7 Drawing Sheets

(51) Int. Cl.
  *H02M 1/00* (2006.01)
  *H02M 3/00* (2006.01)
(52) U.S. Cl.
  CPC ... *H02M 3/33573* (2021.05); *H02M 3/33584*
   (2013.01); *H02J 2207/20* (2020.01); *H02M*
   *1/007* (2021.05)
(58) Field of Classification Search
  CPC .......... H02M 1/38; H02M 1/0032; H02J 7/04;
   H02J 2207/20; H02J 7/855
  See application file for complete search history.

(56) References Cited

U.S. PATENT DOCUMENTS

| | | | |
|---|---|---|---|
| 7,136,295 B2 | 11/2006 | Fuhrmann | |
| 8,717,783 B2 * | 5/2014 | Wang ................ | H02M 3/33592 |
| | | | 363/21.02 |
| 9,379,617 B2 * | 6/2016 | Nishikawa .......... | H02M 3/3353 |
| 9,509,225 B2 | 11/2016 | Stephens | |
| 9,584,029 B2 * | 2/2017 | Zane ................... | H02M 7/5387 |
| 9,692,305 B2 | 6/2017 | Yan | |
| 9,774,269 B2 * | 9/2017 | Matsubara ........ | H02M 3/33584 |
| 9,979,310 B2 | 5/2018 | Guo | |
| 10,211,747 B2 * | 2/2019 | Agamy ................ | H02M 1/088 |
| 10,404,182 B1 * | 9/2019 | Abdel-Rahman ......... | H02J 7/02 |
| 10,749,441 B1 * | 8/2020 | Singh ................ | H02M 3/33584 |
| 10,804,808 B1 * | 10/2020 | Fu ..................... | H02M 3/33584 |
| 11,095,219 B2 * | 8/2021 | Watanabe ......... | H02M 3/33546 |
| 11,469,676 B2 * | 10/2022 | Nakahara ................ | H02M 1/08 |
| 2005/0030767 A1 * | 2/2005 | Phadke .............. | H02M 3/3376 |
| | | | 363/17 |
| 2014/0254203 A1 * | 9/2014 | Dai ......................... | H02M 3/01 |
| | | | 363/17 |
| 2015/0381060 A1 | 12/2015 | Eng | |
| 2016/0079862 A1 * | 3/2016 | Stephens ............. | H02M 3/3376 |
| | | | 363/21.02 |
| 2019/0288607 A1 * | 9/2019 | Zong ................. | H02M 3/33584 |
| 2020/0274457 A1 * | 8/2020 | Kajiyama ............. | H02M 3/335 |
| 2021/0155100 A1 * | 5/2021 | Khaligh .................. | B60L 55/00 |
| 2021/0359613 A1 * | 11/2021 | Leirens .............. | H02M 1/4233 |
| 2022/0077759 A1 * | 3/2022 | Jeong ................ | H02M 3/33573 |
| 2022/0337166 A1 * | 10/2022 | Chan ................. | H02M 3/33584 |
| 2022/0345046 A1 * | 10/2022 | Wang ................ | H02M 3/33573 |
| 2022/0407426 A1 * | 12/2022 | Takeshita ............ | H02M 1/0054 |
| 2023/0066489 A1 * | 3/2023 | Zou ........................... | H02J 7/90 |
| 2024/0136935 A1 * | 4/2024 | Fukuno ............. | H02M 3/33573 |

OTHER PUBLICATIONS

International Search Report dated Apr. 24, 2024 for corresponding International Patent Application No. PCT/US2022/082322.

* cited by examiner

600

Start
Update
602

Receive Current Command
Message
604

Acquire Voltage
Measurement
606

Determine Operating Region And
Time Shift
608

PWM Status
610

Adjust Time Shift To Control
Effective Input Voltage
612

Adjust Frequency To Control
Current Command
614

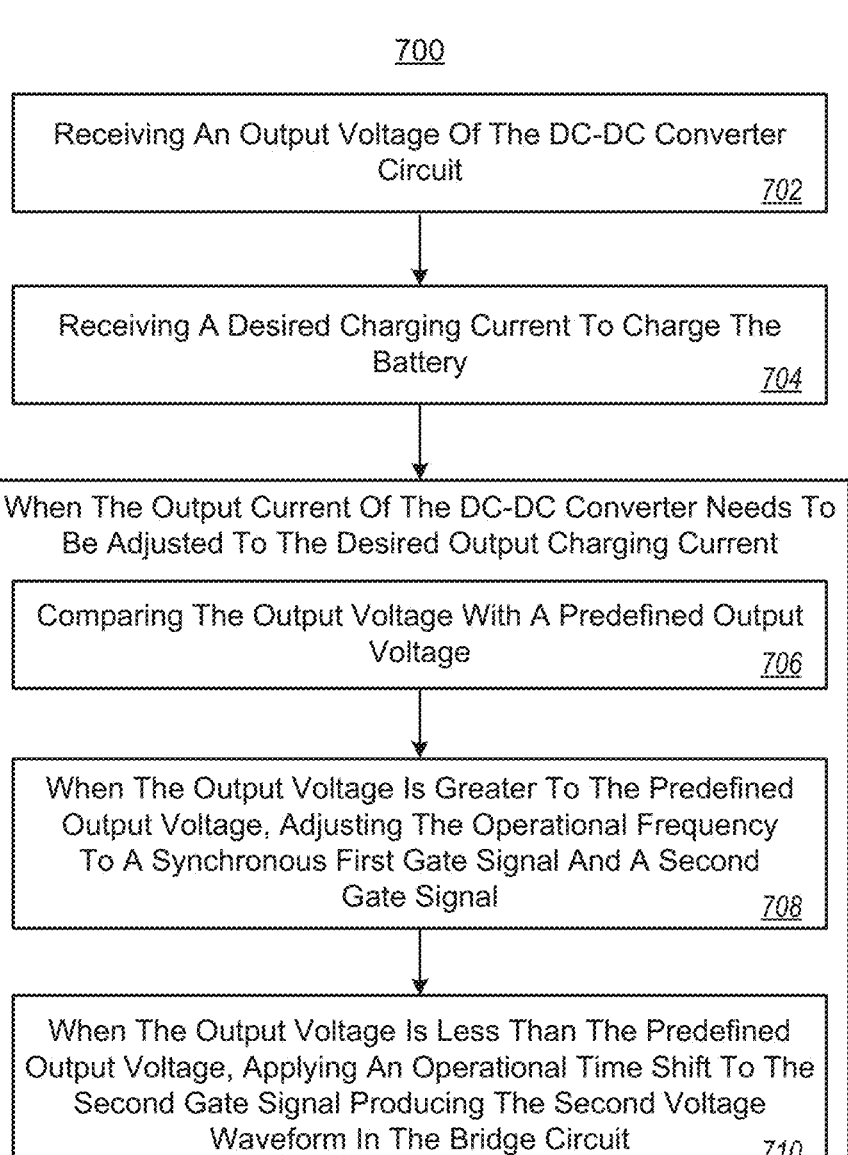

700

| Receiving An Output Voltage Of The DC-DC Converter Circuit |
| 702 |

| Receiving A Desired Charging Current To Charge The Battery |
| 704 |

When The Output Current Of The DC-DC Converter Needs To Be Adjusted To The Desired Output Charging Current

| Comparing The Output Voltage With A Predefined Output Voltage |
| 706 |

| When The Output Voltage Is Greater To The Predefined Output Voltage, Adjusting The Operational Frequency To A Synchronous First Gate Signal And A Second Gate Signal |
| 708 |

| When The Output Voltage Is Less Than The Predefined Output Voltage, Applying An Operational Time Shift To The Second Gate Signal Producing The Second Voltage Waveform In The Bridge Circuit |
| 710 |

FIG. 7

RESONANT CONVERTER HAVING VARIABLE FREQUENCY CONTROL AND VALLEY SKIPPING TIME-SHIFT FOR EFFICIENT SOFT SWITCHING OPERATION

TECHNICAL FIELD

The disclosure relates to a resonant converter having variable frequency control and fixed valley time-shift for efficient soft switching operation.

BACKGROUND

Electric vehicles (EVs) are powered by large packs of batteries in the 400-850 volt range. The electric grid is used to recharge these batteries when they become depleted of charge; however, a converter must be used to convert the power from the electric grid before charging the batteries. The AC (Alternating Current) mains (i.e., power grid) must be converted to a DC (Direct Current) source to be used for charging the battery, more specifically, the DC batteries. Also, a large energy storage element, such as what is found in these EV battery packs, has many applications as an AC power source for supplemental utility use. In this reverse mode of operation where the EV batteries are supplying AC power, the battery charger converts the DC battery voltage into an AC mains source. This AC battery source can be used as a backup generator to power a house during a storm, to power a construction site where there is no utility source, or to simply supplement peak power demands on the utility grid.

Because the amount of energy being transferred in this charging system is large (11-22 kW), it is desirable to have very high efficiency (95-97%) conversion between AC and DC, and vice versa. The customer pays for both the electricity used and for the electricity lost in the transfer. One example of a DC-DC converter that is known for its very high efficiency is the LLC resonant converter. This converter can also be adapted for bidirectional operation by adding a second capacitor, also known as a CLLLC converter.

The resonant converter is able to achieve high efficiency because of the low switching losses in the semiconductors used for exciting the tank circuit (the tank circuit, also known as the LLC circuit, includes two inductors $L_m$, $L_r$ and a capacitor $C_r$ connected in series). The LLC converter can be operated in a boost or buck mode of operation. A boost mode of operation is a step-up mode of operation in a DC-DC power converter that steps up the voltage (while stepping down the current) from its input (supply) to its output (load). A buck mode of operation is a step-down mode of operation in a DC-DC power converter which steps down voltage (while drawing less current) from its input (supply) to its output (load). In the boost mode of operation, the energy used for soft switching the semiconductors is load independent. Furthermore, in this boost mode of operation for the LLC converter, the tank currents are discontinuous. In the state of the art, this is called Discontinuous Conduction Mode (DCM). It is in these discontinuous conduction switching states where the energy is stored for both boosting the output voltage and exciting the switching mechanisms for soft switching. In the buck mode of operation, soft switching becomes more load dependent as the frequency command continues to increase above the resonant point— the point of transition between buck and boost mode. (In the buck mode, the LLC converter tank currents are continuous. This is known as Continuous Conduction Mode or CCM.)

Therefore, to maintain high efficiency that is load independent, the tank circuit must be operated close to resonant frequency or below.

This efficiency limitation is not the only limitation of the LLC converter when used as an EV battery charger. Reaching the desired charging voltage can be a challenge for this topology if the battery operating range is large. One approach used to overcome this low voltage limitation is suggested by Dennis Stephens and Young Kang in U.S. Pat. No. 9,509,225 to mode switch between frequency modulation and fixed frequency phase modulation when the excitation is provided by a full bridge converter. But while this method is effective for controlling switching to a lower voltage, the lagging edge phase leg in the full bridge circuit suffers from high switching losses. (The full bridge converter in this case being a single-phase converter consisting of two phase legs, but a plurality of phases can exist.)

SUMMARY

To overcome the setbacks of the prior art discussed above, the disclosure provides a method and system that implement a fixed time shift operation to reduce the effective input voltage, while maintaining soft switching, and continuing to operate in variable frequency mode. One aspect of the disclosure provides a method of operating a DC-DC converter circuit to maintain an output current to charge a battery. The DC-DC converter circuit includes a tank filter and is operated at an operational frequency and has a bridge circuit coupled to the tank filter that produces a first voltage waveform and a second voltage waveform. The second voltage waveform has a phase shift with respect to the first voltage waveform. The method includes receiving an output voltage of the DC-DC converter circuit and receiving a desired charging current to charge the battery. When the output current of the DC-DC converter needs to be adjusted to the desired output charging current, the method includes comparing the output voltage with a predefined output voltage. When the output voltage is greater or equal to the predefined output voltage, the method includes adjusting the operational frequency to a synchronous first gate signal and a second gate signal each operating at 50% duty cycle which causes the output current to be adjusted to the desired output charging current. When the output voltage is less than the predefined output voltage, the method includes applying an operational time shift to the second gate signal producing the second voltage waveform in the bridge circuit. The second gate signal is operating at 50% duty cycle and at the operational frequency.

Implementations of the disclosure may include one or more of the following optional features. In some implementations, the method includes receiving a battery voltage of the battery. When the battery voltage is below 450 volts, the method includes adjusting the operational frequency between 200 kHz and 300 kHz and applying a fixed time shift to reduce the effective bridge voltage while maintaining soft switching in both phase legs of the bridge circuit. In some examples, applying the fixed time shift results in an increase in tank current whereby soft switching in both phase legs of the bridge circuit is maintained. The method also includes setting the fixed time shift to specific set points for soft switching and continuously modulating the operational frequency to maintain an operating point for the output current in a single closed-loop operating mode.

In some implementations, the first voltage waveform and the second voltage waveform are produced by actuating pairs of transistors of the bridge circuit. The output current may be regulated to the desired current as communicated by the battery control manager.

In some examples, the output current charges a high voltage electric vehicle battery pack. The DC-DC converter circuit transforms an input voltage. In some implementations, the DC-DC converter circuit is a Full Bridge CLLLC DC-DC Converter configured for bidirectional functionality.

Another aspect of the disclosure provides a controller having data processing hardware and memory hardware in communication with the data processing hardware. The memory hardware stores instructions that when executed on the data processing hardware cause the data processing hardware to perform operations that include the above method.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a schematic view of an exemplary arrangement of operations for a method of operating a DC-DC converter circuit to maintain an output current to charge a battery.

Like reference symbols in the various drawings indicate like elements.

DETAILED DESCRIPTION

An AC (Alternating Current) mains (i.e., power grid) is converted to a DC (Direct Current) source to be used for charging a battery of an electric vehicle (EV). The EV vehicle includes DC batteries and therefore requires DC current to be charged. In some examples, a large energy storage element, such as what is found in EV battery packs, may be used as an AC power source for supplemental utility use. In this reverse mode of operation where the EV batteries are supplying AC power instead of receiving AC power, the battery charger converts the DC battery voltage into an AC mains source. This AC battery source may be used as a backup generator to power a house during a storm, to power a construction site where there is no utility source, or to simply supplement peak power demands on the utility grid. Therefore, to overcome the setbacks of the prior art discussed above regarding the application of the high voltage reverse mode of the DC batteries, the disclosure provides a method and system that implement a fixed time shift operation to reduce the effective input voltage, while maintaining soft switching, and continuing to operate in variable frequency mode.

Figure 1:
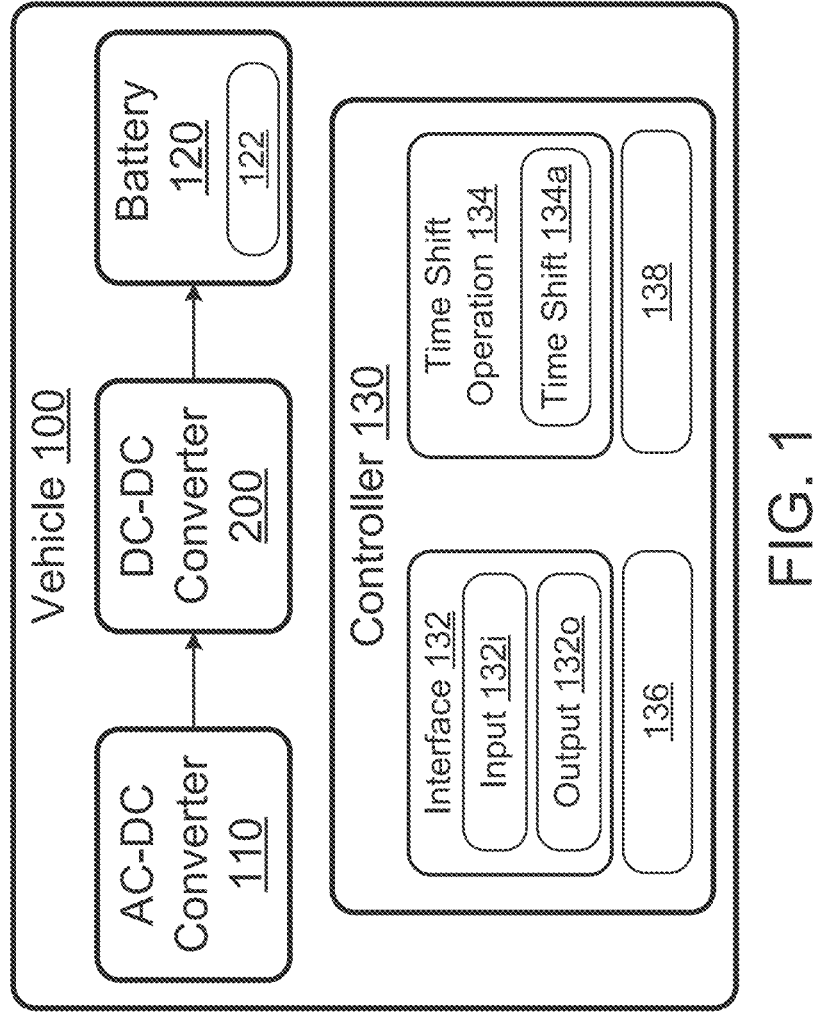
FIG. 1 is a schematic view of a vehicle with a controller implementing an exemplary time shift operation.
Figures 2A, 2B:
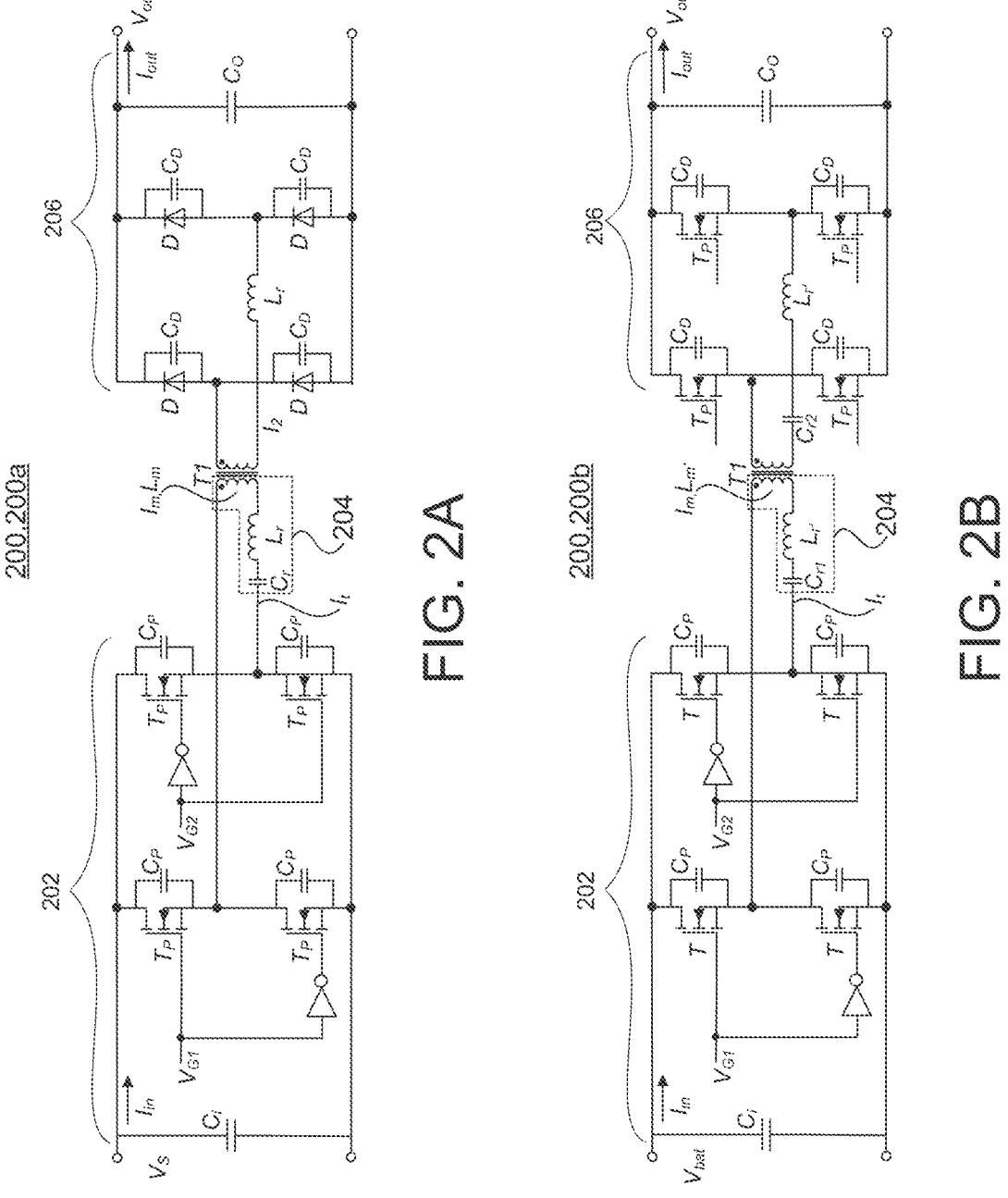
FIG. 2A is a schematic view of an exemplary LLC resonant converter executing the time shift operation of FIG. 1.
FIG. 2B is a schematic view of an exemplary CLLLC bidirectional DC-DC converter executing the time shift operation of FIG. 1.

Referring to FIGS. 1 and 2A, an electric vehicle 100 includes an AC-DC converter 110 that receives energy from the grid by way of a vehicle charging plug. The AC-DC converter 110 includes a front-end power factor correction (PFC) circuit that processes the AC mains to provide a fixed DC voltage with low harmonic distortion on the grid. The DC voltage provided by the AC-DC converter 110 cannot provide the needed charge voltage to the battery 120 as it is limited by the utility company (the PFC circuit only boosts the input voltage). Therefore, a fine resolution of DC-DC current control is needed in a second stage converter (i.e., DC-DC converter 200) to use the DC voltage provided by the AC-DC converter 110 for charging the battery 120. The DC-DC converter 200 is an electronic circuit that converts direct current from one voltage level to another voltage level. The DC-DC converter 200 may be an LLC resonant converter or phase shifted full bridge converter or a combination of the two.

A controller 130, being a processing device or hardware processing device 136, includes an interface 132 having an input 132i and an output 132o. The controller 130 controls the DC-DC converter 200 to a modulated operational frequency $f_o$. The controller 130 produces a first gate signal $V_{G1}$ and a second complementary gate signal $V_{G2}$ switching at this operational frequency $f_o$, each with 50% duty cycle and complements of each other; the second gate signal $V_{G2}$ having also a controlled operational phase shift $\theta_o$, with respect to the first gate signal $V_{G1}$ where signal state overlap is introduced. The operational frequency $f_o$ is modulated between 100 kHz and 300 kHz. The operational phase shift $\theta_o$, is 0 to 180 degrees, and the overlapping time $t_{off}$ of the gate signals is $\theta_o/f_o/360°$. The input 132i of the interface 132 receives a measurement of an input voltage $V_s$ of the DC-DC converter 200, a measurement of an output voltage $V_{out}$ of the DC-DC converter 200, and a desired charging current $I_d$. The controller 130 communicates with the AC-DC converter 110 and/or the battery 120 to receive this desired charging current $I_d$. The output boundaries for the controller 130 are defined by the voltage state of charge of the battery 120. The input boundaries to match this output boundary are defined by the minimum and maximum operational frequencies $f_{oMin}$ and $f_{oMax}$, and minimum and maximum operational phase shift $\theta_{oMin}$ and $\theta_{oMax}$.

When the output current $I_{out}$ of the DC-DC converter 200 needs to be adjusted to the desired output charging current $I_{out}$ and the output voltage $V_{out}$ is above a particular output voltage $V_{outRegion}$, the operational frequency $f_o$ is adjusted by way of gate signals $V_{G1}$, $V_{G2}$ via the output 132o of the controller interface 132 to adjust the output current $I_{out}$ to the desired output current $I_d$.

When the output current $I_{out}$ needs to be adjusted and the output voltage $V_{out}$ is below a particular output voltage $V_{outRegion}$, an operational phase shift $\theta_o$ is introduced to the second gate signal $V_{G2}$ operating at 50% duty cycle. This operational phase shift $\theta_o$ does not have controlled modulation as in the case for the prior art, but is still modulated, as shall be explained. The gate signal overlap, resulting from the phase shift $\theta_o$, results in tank excitation with reduced RMS bridge voltage. This RMS bridge voltage is the product of the DC link voltage and the square root of 1 minus the operating frequency doubled times the overlap time $t_{off}$. This overlap time $t_{off}$ is fixed for this particular region. And because it is fixed, the phase shift $\theta_o$ is modulated as a result of the modulating frequency $f_o$ and is equal to $t_{off}·f_o·360°$. The controller 130 continues to adjust the output current $I_{out}$ to the desired output current $I_d$, using frequency modulation of $f_o$, by way of the gate signal control $V_{G1}$, $V_{G2}$, but now with reduced RMS bridge voltage.

For the application of EV chargers, the DC link voltage $V_s$ is the input voltage to the DC-DC converter 200, and is approximately fixed for this example, as determined by the AC mains. For an 800-volt EV battery, a deep discharge state could be as low as 450 volts. A conventional LLC DC-DC converter may operate at 200 kHz at 450 volts output. In this example, the resonant frequency is selected to be 170 kHz and the 450 volt output operation is in buck mode. As a result of the charging current the battery voltage increases until the operating frequency reaches resonant at 170 kHz. The battery is now 500 volts. The LLC DC-DC converter begins to operate in boost mode below this frequency. When the battery reaches the fully charged state of 830 volts, the LLC DC-DC converter is now operating close to the minimum frequency, as determined by the boundary conditions. In summary, 830 to 450 volts of output range may be fully operated with conventional frequency modulation, a fixed input voltage and within the range of operation where soft switching and high efficiency is maintained.

For many vehicle models, there is not a single battery pack. Instead, there may be two or three different battery packs, each with different series and parallel configurations of battery cells to support the vehicle size and weight. However, it is not desirable for the OEM (Original Equipment Manufacturer) to have multiple battery chargers. Therefore, the battery charger is required to operate over a voltage range to support the combination of all battery packs. The smallest battery pack may have a state of charge from 350 volts to 650 volts. This combined with the previous example results in a charger that is required to operate from 830 to 350 volts. As will be appreciated, there is not a single way to achieve this lower 350-volt operating condition. Using only the LLC DC-DC buck mode, the operating frequency $f_o$ will be as high as 500 kHz. This higher frequency is not desirable due to the higher losses in the transformer, resulting in higher cost litz wire. Furthermore, when the frequency is this far removed from the resonant frequency, 170 kHz in this example, the switching losses in the bridge become unmanageable when the desired current is low. In the prior art, the controller 130 would fix the operating frequency to 200 kHz, and instead adjust gate signal phase shift below 450 volts. But this method also results in high switching loss in the bridge, particularly with the transistors being controlled by the second gate signal $V_{G2}$, also known in the state of the art for phase-shifted full bridge converters as the lagging edge. As disclosed herein, for this example, the controller 130 continues to adjust the operating frequency $f_o$ above 200 kHz, when the battery voltage is below 450 volts, but only to 300 kHz instead of 500 kHz, and with region(s) of fixed time shift that is (are) determined by the dynamics of the bridge voltage, which is now also operating in Discontinuous Conduction Mode, similar to the boost mode, in order to maintain soft switching and high efficiency.

FIG. 2A shows a Full Bridge LLC DC-DC Converter 200, 200a. The converter 200 includes a primary side or bridge circuit 202 and a secondary side or secondary circuit 206. The primary side 202 includes a plurality of transistors $T_P$ and capacitors $C_P$ shown here to resonate with a tank current $I_t$ of a resonant LC tank 204 to achieve the desired zero voltage switching during a controlled dead time. Each transistor $T_P$ is in parallel with a capacitor $C_P$. As shown, there are a total of four transistors-capacitors $T_P$, $C_P$. Primary and secondary side leakage inductance is shown as $L_r$, but is understood to be the total series inductance, including additional inductors if so chosen. A plurality of secondary side rectifier diodes D are each in parallel with a capacitor $C_D$ and resonate with leakage inductance $L_r$ (e.g., in a third region R3 shown and discussed with respect to FIG. 3) that is operating and used to aid in soft switching. The secondary side capacitors $C_D$ may be parasitic junction capacitance only or additional discrete capacitors chosen for decreasing secondary resonant frequency.

For the LLC DC-DC Converter 200, 200a there are two resonant frequency points that determine the boost/buck operation and boundary conditions. As previously mentioned, the boost mode of operation is a step-up mode of operation in a DC-DC power converter that steps up the voltage (while stepping down the current) from its input (supply) to its output (load); while the buck mode of operation is a step-down mode of operation in a DC-DC power converter which steps down the voltage (while drawing less current) from its input (supply) to its output (load). The bridge circuit 202 excitation voltage results in a tank current $I_t$ to flow therethrough into the resonant LLC tank 204. The transformer T1 magnetizing and leakage inductance $L_m$ and $L_r$ determine the resonant response, along with a resonant capacitor bank $C_r$, shown in FIG. 2A. The two resonant frequencies that determine the boost/buck operations and boundary conditions may be determined by the transformer and capacitor parameters alone, or two capacitors (Cr1, Cr2, shown in FIG. 2B) in the case of the CLLLC converter. The minimum operating frequency $f_{oMin}$ is determined by the following equation (along with proper guardbanding) and serves as a boundary condition for converter stability in the boost region.

$$f_1 = \frac{1}{\sqrt{(L_m + L_r) * C_r}} \tag{1}$$

where $L_m$ is the magnetizing inductance and $L_r$ is the leakage inductance, and Cr is the resonant capacitor bank. The second resonant frequency $f_2$ is determined by the following equation and serves as the boundary point between boost and buck mode of operation:

$$f_2 = \frac{1}{\sqrt{L_r * C_r}} \tag{2}$$

The frequency of the bridge voltage serves as excitation of the tank circuit 204 in order to provide the necessary output response. Frequency modulation between the first and second resonant frequencies $f_1$, $f_2$ is the boost mode of operation. Frequency modulation above the second resonant frequency $f_2$ is the buck mode of operation. Operation of the resonant LLC tank 204 below the first resonant frequency $f_1$ is not typically used because the gain G begins to attenuate, is therefore non-monotonic and is more difficult to control. The amount of gain G required from the resonant tank 204 is determined by the battery 120 voltage range. There are two parameter ratios in the tank circuit that may be used to determine this gain G. The first ratio is the two inductances, $M_L = L_m/L_r$. The second ratio is the characteristic impedance squared, $Z_c^2 = L_r/C_r$. The larger the ratio $M_L$ of the inductances, the lower the gain G in the boost region. The larger the characteristic impedance, the smaller the gain G in the boost region. This resonant LLC tank 204 excitation response is in addition to the amount of magnetizing inductance $L_m$ required to maintain soft switching in the semiconductors in the boost mode. It should be understood that the ratio of the square root of the secondary and primary magnetizing inductances also set the transformer $T_1$ turns ratio N and may therefore also be used to achieve the desired output response to the battery 120. The turns ratio is the number of turns on the secondary coil of the transformer Ty to the number of turns on the primary coil.

For controlling the LLC converter 200, an output voltage $V_{out}$ is measured and a desired current setpoint $I_d$ is received by the battery control manager 122 of the battery 120. The controller 130 analyzes the received output voltage $V_{out}$ and the current setpoint $I_d$ to determine a Fixed time shift 134a for a full bridge converter 202 operating with variable frequency control and 50% duty cycle. The fixed time shift 134a is in nanoseconds. When the lagging phase leg in the full bridge converter 202 is shifted in time by the Fixed time shift $t_{off}$, the effective voltage to the resonant LLC tank circuit 204 is zero potential for controlled duration of time while the controller 130 continues to adjust frequency to achieve the desired setpoint for an output current $I_{out}$. When the controller 130 introduces the Fixed time shift 134a, the tank current $I_r$ decreases in a predictable fashion based on chosen parameters for the resonant LLC tank circuit 204. When the secondary current $I_2$ decreases below the load current $I_{out}$, the full wave rectifier diodes D begin to behave like capacitors. This diode junction capacitance reacts with the leakage inductance Lr' (of the secondary circuit 206) to form a second and higher frequency resonant tank circuit. This particular resonant state results from there being no energy transfer in the transformer T1, same as the DCM state in the boost mode. If the lagging phase leg is instead shifted by a modulated phase angle, the switching event can occur in the valley of this second resonant tank circuit response. In this case, there is no stored energy in the magnetizing inductance $L_m$ for soft switching and high semiconductor losses result. However, when the leakage inductance $L_r$ is known by design, the transformer currents and their slopes are known and the valley times during discontinuous conduction are also known. The fixed time shift $t_{off}$ may be calibrated for valley skipping instead, and soft switching energy results for more efficient operation, as long as there is sufficient secondary resonant current being reflected back to the primary side of transformer T1. Also, since the fixed time shift 134a is constant, the LLC resonant converter 200 is still controlled by frequency modulation throughout. The implication here is that the transformer primary and secondary leakage inductances $L_r$ are precisely chosen design parameters for controlling the LLC converter 200 and for setting the secondary tank response during discontinuous conduction for the purpose of valley skipping transistor timing resulting in soft switching events. Alternatively, additional capacitors $C_o$ may be placed in parallel with the rectifier diodes D to adjust the secondary tank response and resulting valley time skipping. As the HV battery 120 is charged, the voltage $V_{out}$ increases, and the Fixed time shift 134a is no longer beneficial. When this voltage $V_{out}$ is detected, the Fixed time shift 134a is returned to zero, or no time shift, and normal operation presumes until the battery is fully charged. The above description relating to fixed time shift applies to both an LLC Resonant DC-DC converter in charge mode, and to a CLLLC bidirectional DC-DC converter running in discharge mode.

The described method is advantageous above the resonant frequency $f_2$ of an LLC converter 200a where the gain becomes flat. In the prior art, controlling the time shift 134a with a fixed frequency phase angle modulation leads to operating conditions where the power transistors in the lagging phase leg of the full bridge circuit 202 have high switching losses. Instead, this control algorithm sets the time shift 134a to specific (fixed) set points that guarantee soft switching operation while the current-controlled variable frequency modulation sets the operating point for the output current $I_{out}$. In this manner, only one control mode is required over a wide output voltage range, even though a phase shift operation is introduced when lower voltage is required.

FIG. 2B shows a Full Bridge CLLLC DC-DC Converter which is an adapted LLC Converter for bidirectional functionality. During discharge mode of the battery 120, which provides a backup generator to power a house during a storm, to power a construction site where there is no utility source, or to simply supplement peak power demands on the utility grid, or any other similar uses, the fixed time shift operation 134 is advantageous in the CLLLC bidirectional DC-DC converter 200b. In discharge mode, the EV battery 120 is closer to a fully charged state in the beginning and the AC load is unknown. The DC voltage that services the PFC acts as a buffer to support the AC load. As it discharges, the HV battery 120 recharges the DC link capacitor bank Ci using the CLLLC converter. The voltage level on the DC link capacitors is constantly monitored while being recharged and prevents over-charge by turning off the CLLLC converter 200b. In this reverse mode of operation, the gain of the CLLLC tank 204 is larger than desired for an optimally designed charge mode. This is due to the fact that the transfer function is inverted. Consequently, without impacting the charge mode optimization, the CLLLC converter 200b operates only in short bursts in order to recharge the DC link capacitors when in this discharge mode. Short bursts mean high current and high power bursts. These short high-power bursts can cause additional stress on the semiconductors and high AC ripple current on the HV battery 120. To reduce the intensity of these power bursts, the Fixed time shift 134a is used in the discharge mode also. For controlling the CLLLC converter 200b in discharge mode the battery voltage $V_{bat}$ is measured, and a look-up table may be used to determine the amount of Fixed time shift 134a. Depending on the load and tank parameters (i.e., magnetizing inductance $L_m$, leakage inductance $L_r$, and resonant capacitance Cr1) of the tank 204 the frequency of operation could be saturated to the maximum frequency of operation that still provides soft switching. When the battery voltage $V_{bat}$ decreases with use, the frequency may be again controlled to support the AC load demand if necessary. With continued use, the HV battery 120 discharges and may reach a voltage $V_{bat}$ where a Fixed time shift 134a is no longer necessary and normal operation presumes, based on the values set in the look-up table.

In some examples, when a series LLC converter 200a is designed for a wide operating range, losses increase as the operating frequency decreases below resonance. The increase in losses are due to the increased time needed to charge the resonant capacitor Cr for higher output voltages $V_{out}$. During this time, no energy is transferred to the output $I_{out}$ and the magnetizing current $I_m$ increases. The magnetizing current $I_m$ is the current that flows through the primary winding of the transformer T1 establishing the magnetic field in the core. Most of the output voltage range must operate in this boost mode because the gain curve is flatter in the buck region. Consequently, the turns ratio N of the transformer T1 must be set to achieve the lowest output voltage. At this operating point, if it is also required to operate with low output current $I_{out}$, then the magnetizing inductance must be low enough to still achieve soft switching in the full bridge transistors. In summary, the parameters needed to support this low voltage low current operating point consequently maximize the magnetizing current $I_m$ and transformer core flux at the maximum output voltage $V_{out}$ operating point. Furthermore, this turns ratio N constraint also maximizes the primary side voltage across the transformer T1. This translates into greater clearance and creepage spacing or solid insulation requirements. To reduce this peak operating voltage and loss, the resonant operating range must decrease. This means increasing the turns ratio N. Since the output voltage $V_{out}$ is reflected to the primary, an increased turns ratio N means lower core flux and thus lower hysteresis loss for a given core geometry. And this can be done since the low current low voltage operating point will be achieved instead with the new fixed time shift operation.

Figure 3:
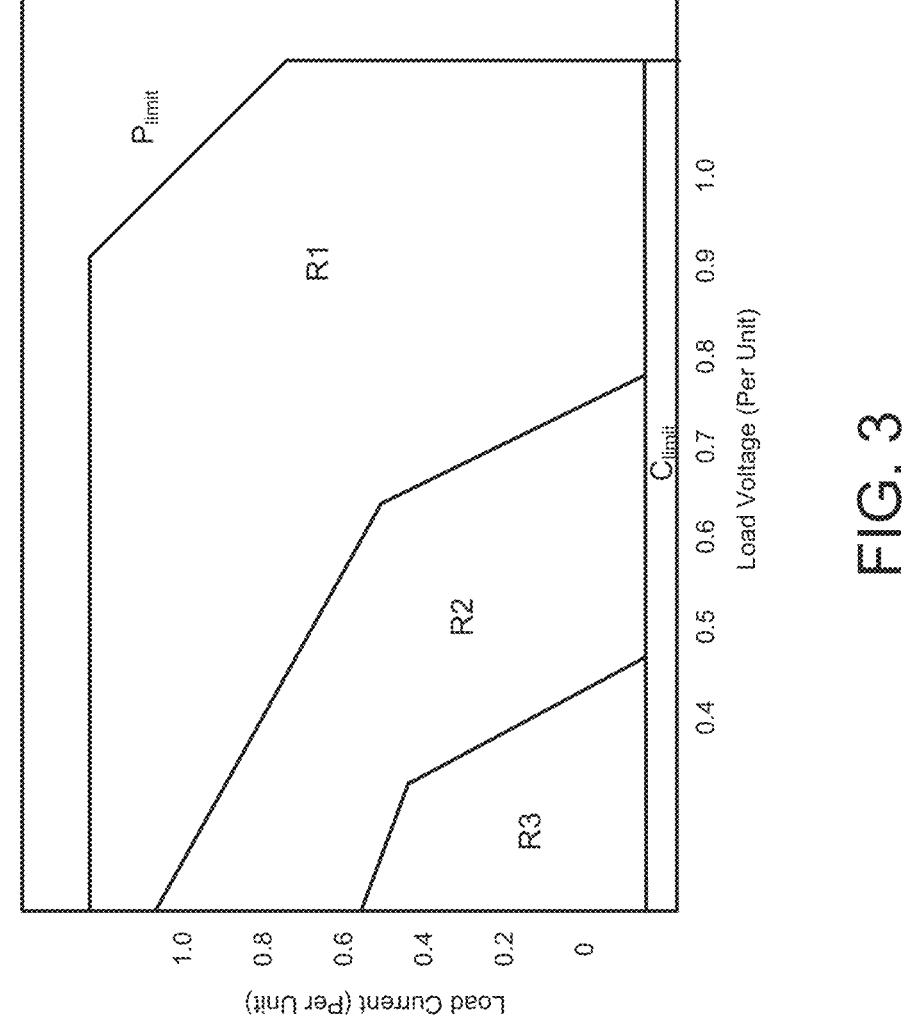
FIG. 3 is a schematic view of an exemplary chart for the regions of operation of a DC-DC converter of FIG. 1.

FIG. 3 illustrates the regions of operation of the LLC converter 200a. The load current $I_{out}$ (i.e., per unit current) and load voltage $V_{out}$ (i.e., per unit voltage) are the inputs defining the operating regions. There is also a constant power mode shown representing the power limitation $P_{limit}$ and current limit $C_{limit}$ representing the current limitation. Within these boundaries there are three regions of operation, R1, R2, and R3. Within a first region R1, the controller 130 does not apply a time shift operation 134 to the converter 200. In this region soft switching is achieved throughout and is dominated by the DCM boost region where frequency is modulated between f1 and f2.

Figure 4:
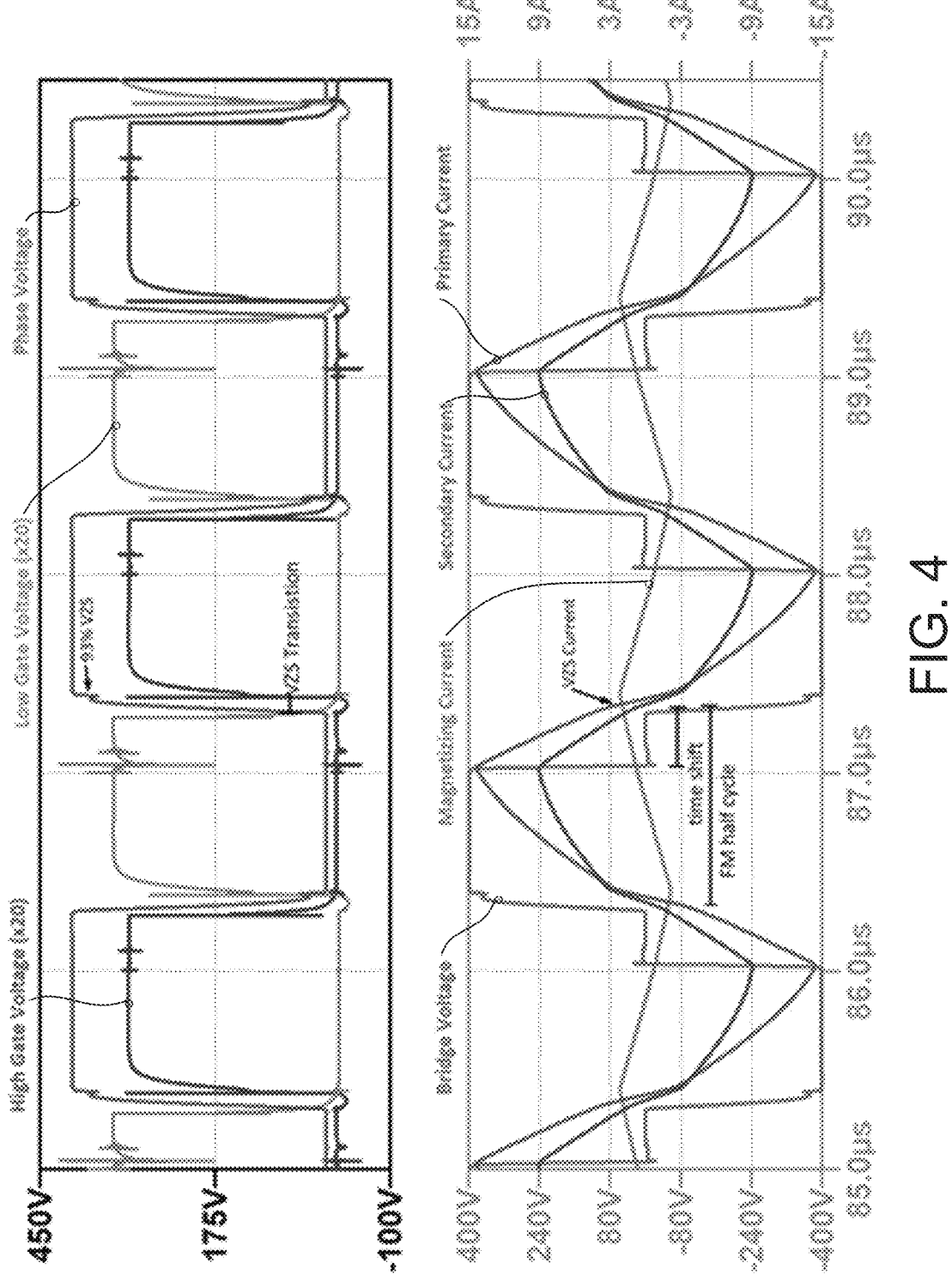
FIG. 4 is a schematic view of an exemplary tank circuit and voltage waveform of the second region shown in FIG. 3.

In a second region R2, the controller 130 executes a Fixed time shift operation 134 and applies the fixed time shift 134a to reduce the effective bridge voltage as explained already. Additionally, in the second region R2 the current $I_t$ of the primary side tank 204 decreases during this Fixed time shift operation 134, but the current $I_t$ of the primary side tank 204 does not reach zero at the end of the half period. The current $I_t$ of the primary side tank 204 at this transition point is equal to the magnetizing current $I_m$ that still remains in the tank 204. This tank current $I_t$ is used for soft switching the semiconductors $T_P$, $C_P$ of the primary side circuit 202. In the secondary side 206, the current $I_2$ reaches zero, and then, the current $I_2$ continues into the next cycle, mimicking the buck/boost transition or point of critical conduction (the transition point between CCM and DCM). As the di/dt slope in this region is known, the time from the desired peak current to the current required for soft switching is known, and thus the Fixed time shift 134a is known for supporting high efficiency soft switching. FIG. 4 illustrates waveforms within the second region R2 of the tank circuit current waveforms $I_t$ and voltage waveforms showing continuous current time shift and soft switching current. This example shows conditions close to the boundary where 93% soft switching is achieved.

Referring to FIG. 3, in a third region R3, the secondary current $I_2$ passes the point of critical conduction and begins to oscillate. If the point of critical conduction is already known from the second region R2, then the additional Fixed time shift 134a in the third region R3 is a function of the resonant action between the diode capacitance CD and the leakage inductance Lr' (Lr' is the secondary side leakage inductance). In addition, depending on the initial energy $I_{in}$ going into this circuit 200 there could be multiple peaks and valleys for additional time shifts 134a, but here only one valley skipping time shift region is shown in FIG. 5.

Figure 5:
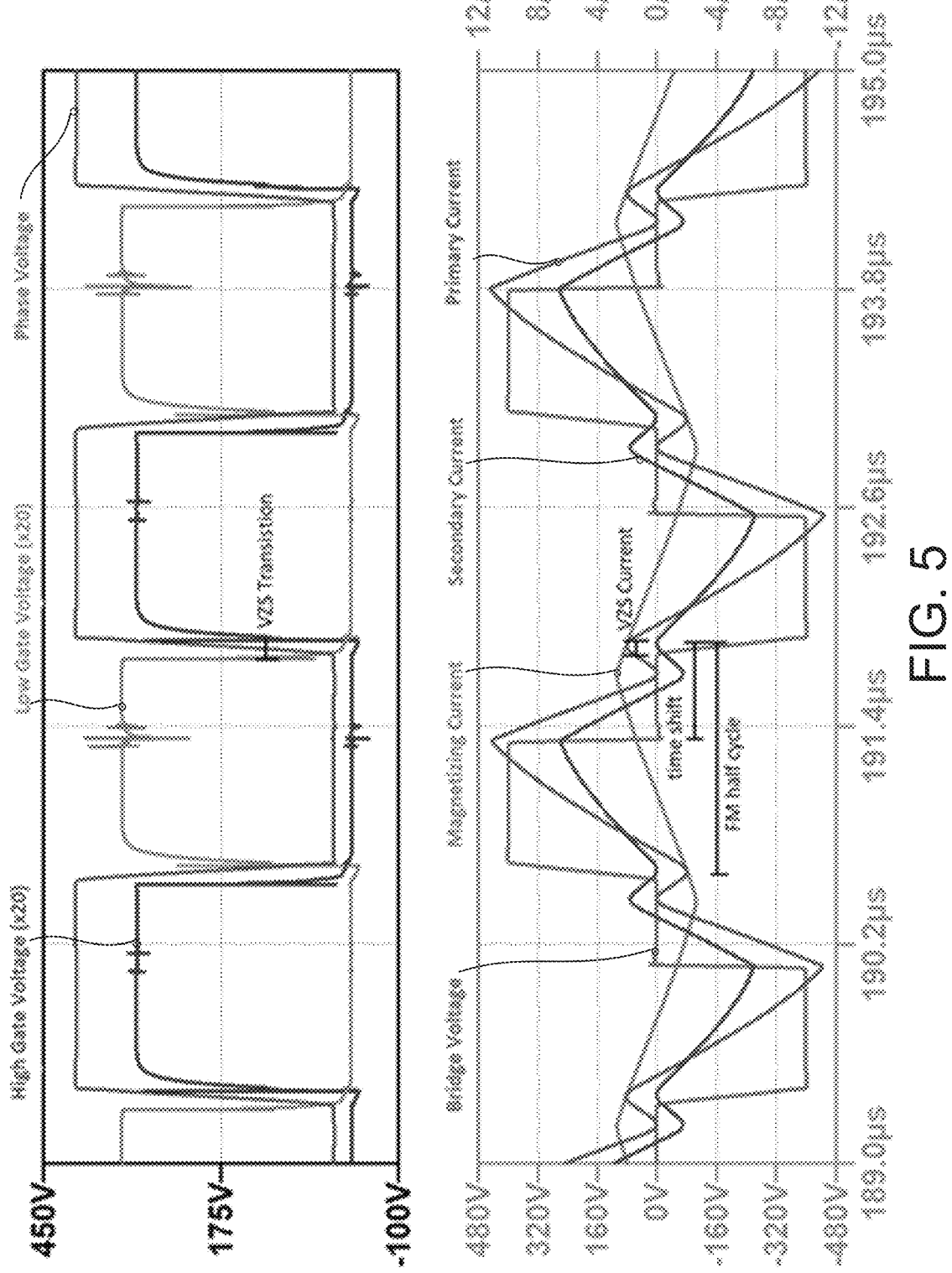
FIG. 5 is a schematic view of the exemplary tank circuit and voltage waveform of the third region shown in FIG. 3.

FIG. 5 illustrates waveforms within the third region R3 of the tank circuit 204 current waveforms $I_t$ and voltage waveforms showing valley skipping time shift for soft switching current.

The fixed time shift may be understood analytically as follows: When entering the discontinuous conduction state the secondary side oscillates from secondary circuit elements. The circuit elements form a series RLC resonant tank. Resistance is characterized by the load and is a function of the output battery voltage and load current. The inductance is the secondary leakage inductance Lr' (secondary leakage and reflected primary leakage). The capacitance is the series combination of two diode junctions in the full bridge rectifier. The general solution to the second order differential equation for the secondary current $I_2$ is, $$i(t) = A_1 e^{-\alpha t - j\beta t} + A_2 e^{-\alpha t + j\beta t} \tag{1}$$

The coefficients $A_1$ and $A_2$ are solved by the initial condition of the current when the transformer bridge enters the discontinuous conduction state. This condition occurs at the peak current, $I_2$. And the other variables $\alpha$ and $\beta$ are derived as follows, $$\alpha = \frac{R}{2L}, \beta = \sqrt{\frac{R^2}{4L^2} - \frac{1}{LC}} \tag{2}$$

In summary, the regional time shift is based on the following equation where i(t) is the desired current for soft switching operation.

$$i(t) = i_p e^{-t\left(\frac{R}{2L} + j\sqrt{\frac{R^2}{4L^2} - \frac{1}{LC}}\right)} \tag{3}$$

The boundary between the second region R2 and the third region R3 is determined by the point of critical conduction. Below this line of critical conduction, the output current is too low for continuous conduction in the secondary current and the time shift needs to be extended past the point where the secondary current goes to zero. The amount of additional time shift is determined by the damped frequency $\omega_d$ a in the secondary resonant circuit because the transition needs to occur at the second peak $i_{p2}$ of the secondary current $I_2$. The first calculation is from the first peak $i_{p1}$ to the second peak $i_{p2}$ in the first resonant cycle. The second calculation is from the second peak to the second peak in the second cycle, $$t_1 = \frac{-\ln\left(\frac{I_{p2}}{I_{p1}}\right)}{-\frac{R}{2L} + j\sqrt{\frac{R^2}{4L^2} - \frac{1}{LC}}}, t_2 = \frac{2\pi}{\sqrt{\frac{R^2}{4L^2} - \frac{1}{LC}}} \tag{4}$$

The leakage inductance $L_r$' and rectifier diode junction capacitance form the natural resonant frequency $\omega_n$. The junction capacitance here is 1.6 nF. For a full bridge rectifier there are two in series or 0.8 nF. The leakage inductance $L_r$' 2.3 uF. The natural resonant frequency is therefore 3.7 MHz and the damped frequency is a little less depending on the effective output load resistance. The second peak oscillation current occurs about 300 ns after the same current is seen on the falling edge. This is time $t_2$. The $t_1$ time is computed to be about 180 ns for this region. But depending on the charge current optimal soft switching may need to be subdivided into more regions.

Region 2

The time from the peak secondary current to zero current may be approximated by the relationships at critical conduction. At critical conduction the peak current is 2× the output current, $I_o$ (also referred to as $I_{out}$). (In some examples, a more accurate peak current can be used to calibrate the time shift for this region.) The time $t_2$ between the peak current and the set point, $I_s$, determined as the minimum current required for soft switching is follows, $$t_2 = \frac{-\ln\left(\frac{I_s}{2I_0}\right)}{-\frac{R}{2L} + j\sqrt{\frac{R^2}{4L^2} - \frac{1}{LC}}} \tag{5}$$

Figure 6:
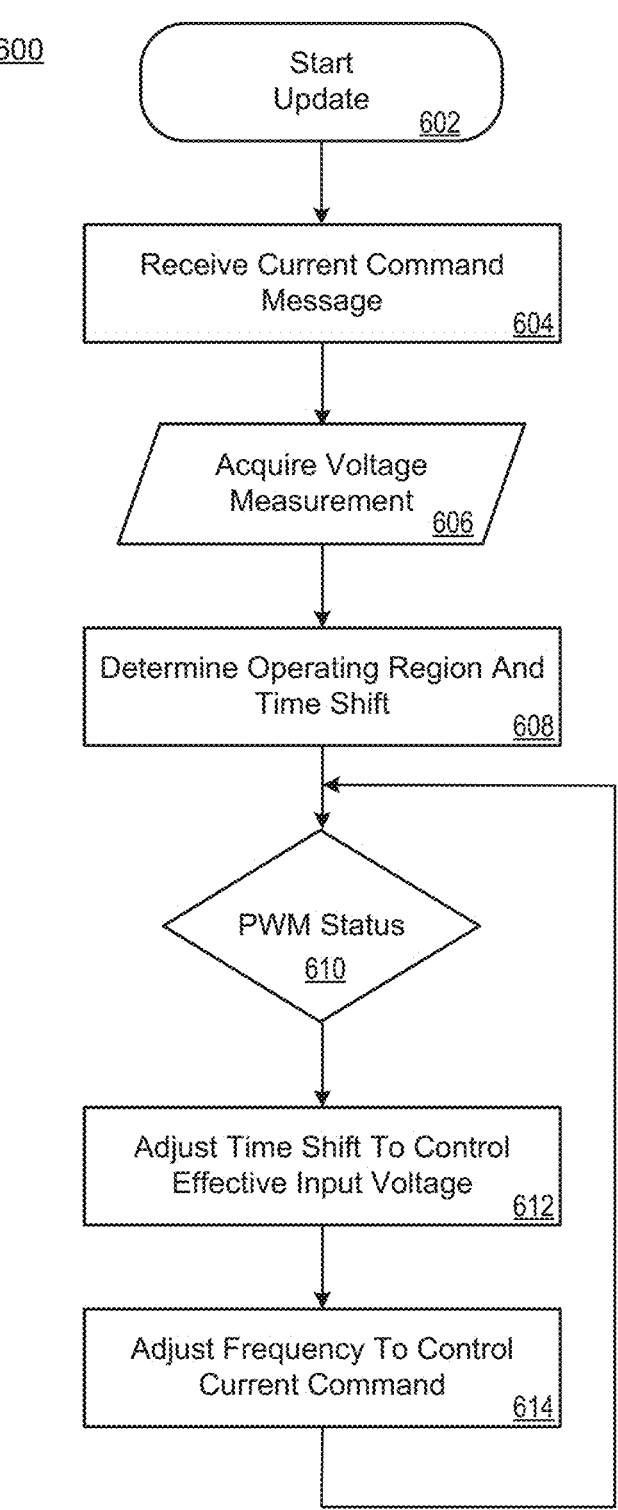
FIG. 6 is a schematic view of an exemplary arrangement of operations for adjusting the time shift of a DC-DC converter shown in FIG. 1.

FIG. 6 illustrates a flow chart for a method 600 of the system described in FIGS. 1-5. The method 600 starts at block 602 with the current command post time and is understood to be a fixed time loop that is much slower than the time loop for updating microcontroller PWM generation. At block 604, in each post time cycle, the controller 130 receives a current command message originating from the battery control manager 122. Following, at block 606, the controller 130 acquires the output voltage measurement $V_{out}$. The controller 130 applies the received current command $I_d$ and output voltage $V_{out}$ in a look-up table and determines the operating region R1, R2, R3 each having a calibrated time shift command $t_{off}$ at block 608, R1 having no time shift as explained. Additionally, the controller 130 pushes the time shift command to the PWM loop cycle along with the period time command for the gate signals at block 610. It should be understood that these time shift commands are also processed for cycle-by-cycle validity, boundary validity and hysteresis control. The initial time shift state may need to be loaded first before the converter 200 is able to operate if the starting output voltage $V_{out}$ and desired current are in one of the regions for Fixed time shift (i.e., second or third regions R2, R3). Otherwise, if the converter 200 is operating and a new time shift command is issued by the controller 130 at block 612, then the error compensation for the adjustable frequency command may not have enough bandwidth to react accordingly at block 614. Consequently, the new time shift command should be processed in the PWM loop with its own compensation for making the transition stable, e.g., a simple ramp function.

FIG. 7 provides an example arrangement of operations for a method 700 of operating a DC-DC converter circuit 200 to maintain an output current $I_{out}$ to charge a battery 120 using the system of FIGS. 1-6. The DC-DC converter circuit 200 includes a tank filter 204 and is operated at an operational frequency $f_o$. The DC-DC converter circuit 200 includes a bridge circuit 202 coupled to the tank filter 204 that produces a first voltage waveform and a second voltage waveform. The second voltage waveform has a phase shift with respect to the first voltage waveform. At block 702, the method includes receiving an output voltage $V_{out}$ of the DC-DC converter circuit 200. At block 704, the method 700 includes receiving a desired charging current $I_d$ to charge the battery 120. When the output current $I_{out}$ of the DC-DC converter 200 needs to be adjusted to the desired output charging current $I_d$, the method 700 includes comparing the output voltage $V_{out}$ with a predefined output voltage $V_{outRegion}$ at block 706.

When the output voltage $V_{out}$ is greater or equal to the predefined output voltage $V_{outRegion}$, at block 708, the method 700 includes adjusting the operational frequency $f_o$ to a synchronous second gate signal $V_{G2}$ that is synchronous with a first gate signal $V_{G1}$, the first gate signal $V_{G1}$ and the second gate signal $V_{G2}$ are each operating at 50% duty cycle and causing the output current $I_{out}$ to be adjusted to the desired output charging current $I_d$.

When the output voltage $V_{out}$ is less than the predefined output voltage $V_{outRegion}$, the method 700 at block 710 includes applying an operational time shift $t_{off}$ to the second gate signal $V_{G2}$ producing the second voltage waveform in the bridge circuit 202. The second gate signal $V_{G2}$ is operating at 50% duty cycle and at the operational frequency $f_o$.

In some examples, the method 700 includes receiving a battery voltage of the battery 120. When the battery voltage is below 450 volts, the method 700 includes adjusting the operational frequency $f_o$ between 200 kHz and 300 kHz and applying a fixed time shift to reduce the effective output voltage while maintaining soft switching in both phase legs of the bridge circuit 202. Applying the fixed time shift results in an increase in tank current $I_t$ whereby soft switching in both phase legs of the bridge circuit 202 is maintained. The method 700 may include setting the fixed time shift to specific set points for soft switching and continuously modulating the operational frequency $f_o$ to maintain an operating point for the output current $I_{out}$ in a single closed-loop operating mode.

In some implementations, the first voltage waveform and the second voltage waveform are produced by actuating pairs of transistors $T_P$ of the bridge circuit 202. The output current $I_{out}$ may be regulated to the desired current $I_d$ as communicated by the battery control manager 122. The output current $I_{out}$ may charge a high voltage electric vehicle battery pack. Additionally, the DC-DC converter circuit 200 transforms an input voltage $V_s$. The DC-DC converter circuit 200 may be a Full Bridge CLLLC DC-DC Converter configured for bidirectional functionality.

It should be understood that any of the controllers described herein may utilize one or more computing devices to implement its various functionality. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described above can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). More-over, the memory may incorporate electronic, magnetic, optical, and/or other types of storage media. The memory can also have a distributed architecture, where various components are situated remotely from one another, but can be accessed by the processor.

The software in any of the memory devices (and utilized by the controller) and described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

A number of implementations have been described. Nevertheless, it will be understood that various modifications may be made without departing from the spirit and scope of the disclosure. Accordingly, other implementations are within the scope of the following claims.

What is claimed is:

1. A method of operating a DC-DC converter circuit to maintain an output current to charge a battery, the DC-DC converter circuit includes a tank filter and is operated at an operational frequency and having a bridge circuit coupled to the tank filter that produces a first voltage waveform and a second voltage waveform, the second voltage waveform having a phase shift with respect to the first voltage waveform, the method comprising:

receiving an output voltage of the DC-DC converter circuit;

receiving a desired output charging current to charge the battery;

receiving a battery voltage of the battery;

when the output current of the DC-DC converter is to be adjusted to the desired output charging current:

comparing the output voltage with a predefined output voltage;

when the output voltage is greater or equal to the predefined output voltage, adjusting the operational frequency to a second gate signal that is synchronous with a first gate signal, the first gate signal and the second gate signal are each operating at 50% duty cycle causing the output current to be adjusted to the desired output charging current; and when the output voltage is less than the predefined output voltage, applying an operational time shift to the second gate signal producing the second voltage waveform in the bridge circuit, wherein the second gate signal is operating at 50% duty cycle and at the operational frequency; and when the battery voltage is below 450 volts, adjusting the operational frequency between 200 kHz and 300 kHz and applying a fixed time shift to reduce an effective RMS bridge voltage while maintaining soft switching in both phase legs of the bridge circuit, wherein applying the fixed time shift results in an increase in tank current whereby soft switching in both phase legs of the bridge circuit is maintained.

2. The method of claim 1, further comprising:

setting the fixed time shift to specific set points for soft switching; and continuously modulating the operational frequency to maintain an operating point for the output current in a single closed-loop operating mode.

3. The method of claim 1, wherein the first voltage waveform and the second voltage waveform are produced by actuating pairs of transistors of the bridge circuit.

4. The method of claim 1, wherein the output current is regulated to the desired output charging current as communicated by a battery control manager.

5. The method of claim 1, wherein the output current charges a high voltage electric vehicle battery pack.

6. The method of claim 1, wherein the DC-DC converter circuit transforms an input voltage.

7. The method of claim 1, wherein the DC-DC converter circuit is a Full Bridge CLLLC DC-DC Converter configured for bidirectional functionality.

8. A controller configured to operate a DC-DC converter circuit to maintain an output current to charge a battery, the DC-DC converter circuit includes a tank filter and is operated at an operational frequency and having a bridge circuit coupled to the tank filter that produces a first voltage waveform and a second voltage waveform, the second voltage waveform having a phase shift with respect to the first voltage waveform, the controller comprising:

data processing hardware; and memory hardware in communication with the data processing hardware, the memory hardware storing instructions that when executed on the data processing hardware cause the data processing hardware to perform operations comprising:

receiving an output voltage of the DC-DC converter circuit;

receiving a desired output charging current to charge the battery;

receiving a battery voltage of the battery;

when the output current of the DC-DC converter is to be adjusted to the desired output charging current:

comparing the output voltage with a predefined output voltage;

when the output voltage is greater or equal to the predefined output voltage, adjusting the operational frequency to a second gate signal that is synchronous with a first gate signal, the first gate signal and the second gate signal are each operating at 50% duty cycle causing the output current to be adjusted to the desired output charging current; and when the output voltage is less than the predefined output voltage, applying an operational time shift to the second gate signal producing the second voltage waveform in the bridge circuit, wherein the second gate signal is operating at 50% duty cycle and at the operational frequency, and when the battery voltage is below 450 volts, adjusting the operational frequency between 200 kHz and 300 kHz and applying a fixed time shift to reduce an effective RMS bridge voltage while maintaining soft switching in both phase legs of the bridge circuit, wherein applying the fixed time shift results in an increase in tank current whereby soft switching in both phase legs of the bridge circuit is maintained.

9. The controller of claim 8, wherein the operations further include:

setting the fixed time shift to specific set points for soft switching; and continuously modulating the operational frequency to maintain an operating point for the output current in a single closed-loop operating mode.

10. The controller of claim 8, wherein the first voltage waveform and the second voltage waveform are produced by actuating pairs of transistors of the bridge circuit.

11. The controller of claim 8, wherein the output current is regulated to the desired output charging current as communicated by a battery control manager.

12. The controller of claim 8, wherein the output current charges a high voltage electric vehicle battery pack.

13. The controller of claim 8, wherein the DC-DC converter circuit transforms an input voltage.

14. The controller of claim 8, wherein the DC-DC converter circuit is a Full Bridge CLLLC DC-DC Converter configured for bidirectional functionality.

15. A method of operating a DC-DC converter circuit to maintain an output current to charge a battery, the DC-DC converter circuit includes a tank filter and is operated at an operational frequency and having a bridge circuit coupled to the tank filter that produces a first voltage waveform and a second voltage waveform, the second voltage waveform having a phase shift with respect to the first voltage waveform, the method comprising:

receiving an output voltage of the DC-DC converter circuit;

receiving a desired output charging current to charge the battery;

receiving a battery voltage of the battery;

when the output current of the DC-DC converter is to be adjusted to the desired output charging current:

comparing the output voltage with a predefined output voltage;

when the output voltage is greater or equal to the predefined output voltage, adjusting the operational frequency to a second gate signal that is synchronous with a first gate signal, the first gate signal and the second gate signal are each operating at 50% duty cycle causing the output current to be adjusted to the desired output charging current; and when the output voltage is less than the predefined output voltage, applying an operational time shift to the second gate signal producing the second voltage waveform in the bridge circuit, wherein the second gate signal is operating at 50% duty cycle and at the operational frequency;

when the battery voltage is below 450 volts, adjusting the operational frequency between 200 kHz and 300 kHz and applying a fixed time shift to reduce an effective RMS bridge voltage while maintaining soft switching in both phase legs of the bridge circuit;

setting the fixed time shift to specific set points for soft switching; and continuously modulating the operational frequency to maintain an operating point for the output current in a single closed-loop operating mode.

16. A controller configured to operate a DC-DC converter circuit to maintain an output current to charge a battery, the DC-DC converter circuit includes a tank filter and is operated at an operational frequency and having a bridge circuit coupled to the tank filter that produces a first voltage waveform and a second voltage waveform, the second voltage waveform having a phase shift with respect to the first voltage waveform, the controller comprising:

data processing hardware; and memory hardware in communication with the data processing hardware, the memory hardware storing instructions that when executed on the data processing hardware cause the data processing hardware to perform operations comprising:

receiving an output voltage of the DC-DC converter circuit;

receiving a desired output charging current to charge the battery;

receiving a battery voltage of the battery;

when the output current of the DC-DC converter is to be adjusted to the desired output charging current:

comparing the output voltage with a predefined output voltage;

when the output voltage is greater or equal to the predefined output voltage, adjusting the operational frequency to a second gate signal that is synchronous with a first gate signal, the first gate signal and the second gate signal are each operating at 50% duty cycle causing the output current to be adjusted to the desired output charging current; and when the output voltage is less than the predefined output voltage, applying an operational time shift to the second gate signal producing the second voltage waveform in the bridge circuit, wherein the second gate signal is operating at 50% duty cycle and at the operational frequency;

when the battery voltage is below 450 volts, adjusting the operational frequency between 200 kHz and 300 kHz and applying a fixed time shift to reduce an effective RMS bridge voltage while maintaining soft switching in both phase legs of the bridge circuit;

setting the fixed time shift to specific set points for soft switching; and continuously modulating the operational frequency to maintain an operating point for the output current in a single closed-loop operating mode.

* * * * *